H. EWING.
SPRING CONTROLLED LINK FOR VEHICLES.
APPLICATION FILED DEC. 4, 1919.

1,386,855.

Patented Aug. 9, 1921.

Hugh Ewing
INVENTOR.

BY
Edwin P. Corbett
ATTORNEY.

UNITED STATES PATENT OFFICE.

HUGH EWING, OF COLUMBUS, OHIO.

SPRING-CONTROLLED LINK FOR VEHICLES.

1,386,855.  Specification of Letters Patent.  Patented Aug. 9, 1921.

Application filed December 4, 1919. Serial No. 342,350.

*To all whom it may concern:*

Be it known that I, HUGH EWING, a citizen of the United States of America, residing at Columbus, in the county of Franklin and State of Ohio, have invented certain new and useful Improvements in Spring-Controlled Links for Vehicles, of which the following is a specification.

My invention relates to spring-controlled vehicle wheel links and has particular reference to that class of devices shown in prior patents of mine wherein the wheels of a vehicle are so connected to the axles thereof that, upon contact with an obstruction, these wheels are swung rearwardly and upwardly against the resistance of springs. In this type of device the contact of the vehicle wheel with obstructions produces no material retardation of the onward movement of the vehicle and substantially no lifting of the vehicle. On the contrary, the wheels move backwardly and upwardly when obstructions are encountered and are restored to their normal positions the instant the obstacles have been surmounted. Except when surmounting an obstacle, the vehicle is supported readily upon the elements which carry the wheels and under preferred construction, even during the surmounting of an obstacle, the vehicle is only partially supported upon the springs which resist the rearward and upward movement of the vehicle wheels.

The present invention is primarily based upon the provision of a novel form of coil spring as one of the elements of a combination of the kind indicated in the preceding paragraph. It is best described in conjunction with the mechanism applied to the front axle of a vehicle and in this connection it contemplates the provision of downwardly depending crank-arms connected at their upper ends to the axle and having stub axles at their lower ends upon which the wheels are to be mounted. Hitherto I have provided springs in the rear of such depending cranks for resisting the rearward and upward movement of such cranks and I have also provided balance springs in the front thereof to oppose the main springs and render the action more sensitive. In the present invention, I have utilized both of these springs but they are both of peculiar form.

These novel springs which I have injected into the combination of my vehicle wheel link are of a type shown in my application Serial No. 337,690, filed November 13, 1919. They are of such form that the resistance which they afford upon compression will increase disproportionately as the compression progresses. Preferably this is accomplished by reducing the space between certain of the coils so that upon compression to a predetermined degree these coils will come into solid abutting relation with the result that the acting portion of the spring will be shortened and the resistance will be increased more suddenly and to a greater extent than would occur in the normal coil spring. I may accomplish this by so constructing the spring that only two coils come into abutting relation at one time or I may accomplish it by so constructing the spring that more than two of the coils will come into solid abutting relation at the same time.

Another feature of my invention has to do with the provision of a buffer spring for limiting the rearward movement of the wheel links. The buffer spring is of a form to resiliently limit the rearward movement of the wheel links and yet is so protected by its manner of mounting and its structure as to be itself protected against breakage from the jars to which it will inevitably be subjected.

The preferred embodiment of my invention is shown in the accompanying drawings wherein similar characters of reference designate corresponding parts and wherein—

Figure 1:
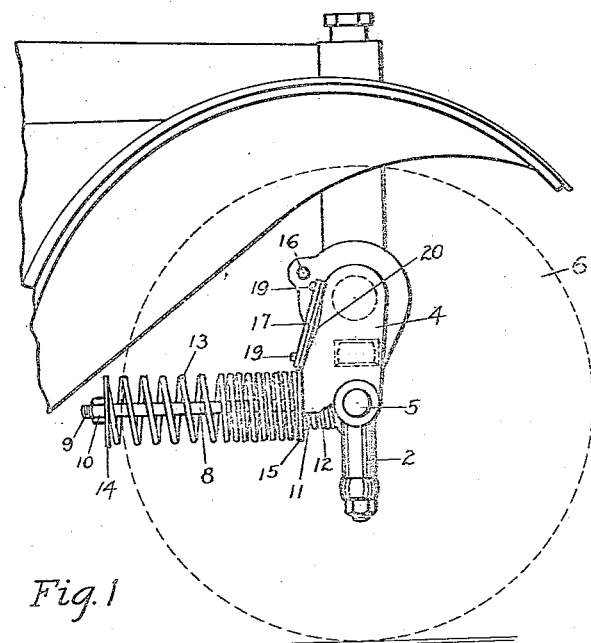
Figure 1 is a side elevation of the front end of a vehicle showing the vehicle wheel in its normal position when it is not attempting to ride over an obstacle.
Figure 3:
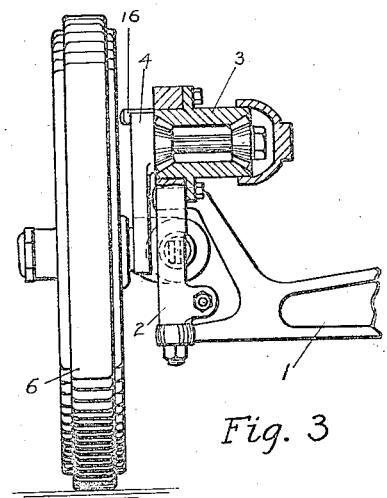
Fig. 3 is a front elevation illustrating the manner of supporting the vehicle wheel from the axle proper.
Figure 2:
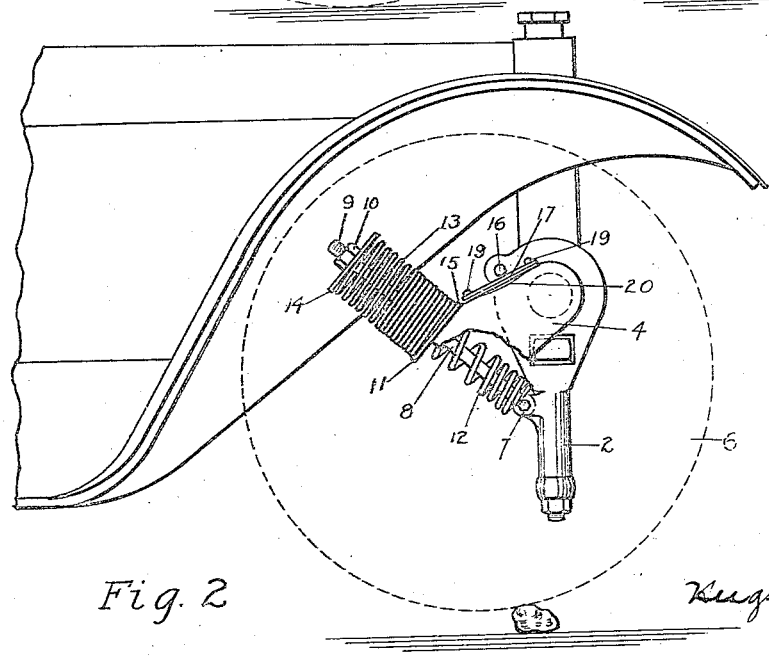
Fig. 2 is a similar view illustrating the position of the wheel and its supporting crank while riding over an obstacle.
Figure 4:
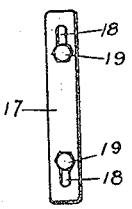
Fig. 4 is a plan view of the buffer spring detached.

In the drawings, the axle tree is shown at 1 as having a steering knuckle 2 rotatably mounted thereon and provided upon its upper end with a roller bearing structure 3 which carries a crank member 4. This crank member 4 is swung from the roller bearing structure 3 and carries at its lower end a stub axle 5 upon which is mounted the wheel 6.

Mounted on the rear of the steering knuckle 2 is a pierced lug 7 to which is pivotally connected a rod 8 threaded at its outer extremity as at 9 for the reception of a nut 10. This rod 8 passes through an aperture formed in an enlargement 11 upon the crank member 4 and this enlargement constitutes a head against which is adapted to operate a spring 12 and a spring 13 disposed upon opposite sides thereof.

More explicitly, the spring 12 is pivoted between the steering knuckle and the head 11 at the same time embracing the rod 8. The coils of this spring are differently spaced in the sense that two or more of these coils are closer together than the balance of the coils of the spring. The spring 13 is similarly constructed to the spring 12. This spring 13 is desirably mounted between two washers 14 and 15, the latter of which bears against the enlargement 11 upon the crank member.

Located directly above the structure just described is provided a buffer mechanism. This comprises a pin 16 carried upon the bearing structure 3 and adapted for coaction with a multiple-leaf spring 17 having slots 18 for coaction with bolts 19 so as to connect it by a rod or sliding connection with the rear surface of the crank arm 4. This rear surface of the crank 4 is provided with a slightly concave surface 20 opposite the center of the multiple leaf spring so as to permit of sufficient yielding of the spring when it comes into contact with the stop 16 but at the same time to provide a positive supporting surface for the spring after it has yielded to a certain predetermined extent.

In operation, the vehicle wheel will maintain the position indicated in Fig. 1 until it strikes an obstacle. When it strikes an obstacle, it will spring backward with the lower end of the crank upon which it is mounted. In the initial portion of its backward and upward movement, the resistance thereto will be relatively slight because of the long spring member. After it has progressed to a certain extent, however, certain of the coils of this spring member will be, in effect, eliminated so as to shorten the effective length of the spring and thereby increase the resistance to compression more rapidly than would the normal spring. By the time this shortening of the effective length of the spring occurs, a portion of the vehicle will be supported by the spring described which of course makes it doubly desirable to stiffen the spring disproportionately to progression. In all probability, by the time these coils are eliminated in the manner described, the obstacle will be safely beneath the wheel and this will have been effected with a minimum jarring action. As soon as the obstacle is surmounted, the energy which has been stored up in the spring 13 will reassert itself and force the wheel back to original position. All jarring in such return is prevented, however, by means of the coil spring 12 which, due to its novel construction, first offers a relatively slight resistance and then gradually stiffens disproportionately to progression. In the event that the rearward and upward movement of the crank member proceeds to an extreme point, the spring 17 will come into contact with the pin 16 which will yieldingly apply a limited resistance to further movement. At first, this resistance will be purely a resilient one and all breakage will be obviated by reason of the fact that the spring has a slot and bolt connection permitting considerable endwise play. Very shortly, however, the spring will be so bent that it will come into positive abutting relation with the surface 20 and preclude all further movement, although as a matter of fact this rarely occurs in practice.

It will be seen that I have provided a novel wheel link structure which because of the novel type of spring in combination with the other parts produces a result hitherto unattainable which is an initial soft resistance followed by a final greatly increased resistance. It will further be apparent that I have provided a simple device for finally limiting the movement of the link described by way of an initial resilient action and a final rigid action.

Having thus described my invention, what I claim is:

1. In a vehicle wheel structure, the combination of a rearwardly and upwardly swinging wheel axle, a stop for limiting the rearward and upward movement of such axle, and an interposed spring which is free at either of its ends for lengthening or shortening.

2. In a vehicle wheel structure, the combination of a rearwardly and upwardly swinging wheel axle, a stop for limiting such rearward and upward swinging movement, an interposed multiple-layer spring having a slot adjacent either end, and pins extending into said slots and capable of relative movement therein.

In testimony whereof I hereby affix my signature.

HUGH EWING.